March 3, 1970     H. W. HALLESY     3,498,648

HIGH TEMPERATURE AND PRESSSURE TUBE FITTING

Original Filed Sept. 17, 1964     2 Sheets-Sheet 1

INVENTOR.
HAROLD W. HALLESY
BY
Raynolds + Christensen
ATTORNEYS

TO HYDRAULIC POWER SUPPLY

INVENTOR.
HAROLD W. HALLESY
BY
Reynolds + Christensen
ATTORNEYS

# United States Patent Office 3,498,648
Patented Mar. 3, 1970

3,498,648
HIGH TEMPERATURE AND PRESSURE
TUBE FITTING
Harold Walter Hallesy, Yakima, Wash., assignor to The Boeing Company, Seattle, Wash., a corporation of Delaware
Continuation of application Ser. No. 397,144, Sept. 17, 1964, which is a continuation-in-part of application Ser. No. 82,871, Jan. 16, 1961. This application Aug. 22, 1968, Ser. No. 757,211
Int. Cl. F16l 13/14, 19/08, 19/06, 17/00
U.S. Cl. 285—343      3 Claims

ABSTRACT OF THE DISCLOSURE

The present invention relates to tube fittings which include an internally serrated sleeve into which tube ends are positioned. The sleeve plastically deforms the material of the tube ends by means of tapered slides which fit over the sleeve.

---

The present application is a continuation of application Ser. No. 397,144, filed Sept. 17, 1964, now abandoned, which is a continuation-in-part of application Ser. No. 82,871, filled Jan. 16, 1961, now U.S. Patent No. 3,149,860.

The present invention relates to tube fittings and in particular to those which operate under severe environmental conditions such as are encountered in missile hydraulic and fuel systems. The invention was disclosed but not claimed in an earlier application in my name, filed Jan. 16, 1961, and now issued as U.S. Patent No. 3,149,860.

Missile hydraulic and fuel systems demand the utmost reliabiilty, yet are subjected to extreme temperature, pressure and vibration-induced forces under the conditions of operation and, in particular, under those at blast-off. Moreover, the network of tubing comprising these systems passes through many congested areas in the missile, and tube fittings that must be made therein are not only difficult to install but also difficult to inspect for integrity of the seal.

A principal objective of my invention is to produce a tube fitting which can withstand the extremely high temperature, pressure and vibration-induced forces to which tubing such as that in missile hydraulic and fuel systems is subjected in flight. Another objective is to produce a tube fitting of this capability which is simple in form, compact, and light of weight, and which can be installed and inspected with ease in areas which are congested with much surrounding equipment. Still further objectives include providing a fitting of this nature which is adaptable as either a permanent fitting or a so-called "reconnectible" fitting, that is, one which can be disconnected and reused when desired. Other objectives will appear from the description following.

Essentially, the tube fitting of my invention comprises an internally serrated sleeve that is bridged over the tube ends and saddled around each of them in such fashion as to cause the sleeve to grip the tubes by sinking its serrations into each tube's outer surface material. More specifically, I provide each of the inside walls of the end portions of the sleeve with a series of circumferential serrations that have an inside diameter corresponding to the outside diameter of the tubes, so that the tubes and serrations make faying contact with one another when the end portions of the tubes are inserted into the end portions of the sleeve. A pair of bands are then applied around the end portions of the sleeve and caused to constrict the sleeve radially inwardly in the region of the serrations to the extent that the serations are depressed into the outer surface material of the tube end portions and the tubes and sleeve take up a state of interference with one another. The bands are then locked around the sleeve end portions to maintain the tubes and sleeve in this state.

Preferably, the bands take the form of slides whose inside surfaces are complementally tapered, but diametrically undersized with respect to the outside surfaces of the sleeve end portions. The slides are then engaged endwise over the end portions of the sleeve until the sleeve is constricted radially inwardly in the regions of the serrations. Moreover, the angle of taper is kept sufficiently low, such as 7 degrees or less from the axis of the sleeve, to lock the slides around the sleeve end portions when the tubes and sleeve are in the state of interference.

By varying the radial constriction effected in the regions of the serrations, it is possible to form either a permanent fitting or a reconnectible fitting.

The preferred form of my fitting is illustrated in the accompanying drawings wherein.

Figure 1:
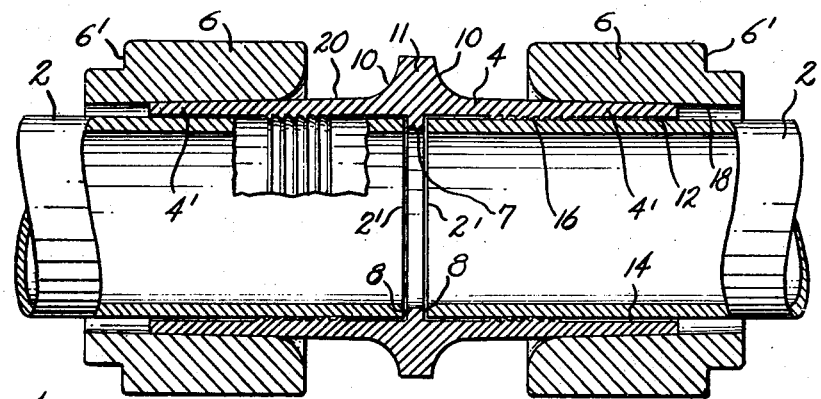
FIGURE 1 is an axial cross section through the fitting after it has been assembled and is ready to be made, but has not as yet been completed.

Refering first to FIGURE 1, note that the illustrated embodiment brings together two tubes whose end portions can be seen at 2. The tubes are united in the manner of the invention by means of the sleeve and pair of slides seen at 4 and 6, respectively. For reasons which will be explained, the tubes, sleeve and slides are all fabricated from the same material, in this case a tough durable stainless steel alloy.

Internally the sleeve has a flange 7 around the interior wall of its central portion. This flange provides a pair of stops 8 for the tubes when the assembly is made. Another pair of stops 10 are formed on the sleeve's exterior, again by means of a flange 11 around its central portion. The latter stops serve to position the slides when they are engaged in the step of making the fitting.

The steps of assembling the fitting are quite simple. Firstly, the slides 6 are passed endwise over the tubes and run in a short distance from their ends 2'. Then the sleeve 4 is interposed between the tubes, and the end portions of the latter are inserted one by one into the end portions 4' of the sleeve until each abuts an internal stop 8 at its center. Once they are so positioned the fitting is ready to be made.

The step of making the fitting relies on several additional features mentioned in part heretofore. For one, note that the interior wall 12 of the sleeve has a diameter slightly larger than that of the tube exteriors and that interposed in the annulus 14 between the members at each end of the sleeve are a series of circumferential serrations 16 which themselves have an inside diameter corresponding to that of the tube exteriors.

Faying contact is thus made between the serrations and the tubes as the latter slide inwardly past the serrations. Another concerns the inside and outside surfaces of the slides and the sleeve end portions, 18 and 20 respectively. Diametrically, the former are slightly undersized with respect to the latter. To enable the slides to be engaged over the sleeve end portions, however, the surfaces are complementarily tapered relatively inwardly in the directions running axially outwardly from the center of the sleeve. Moreover, since they are to be engaged indefinitely by their own means, a locking angle of seven degrees (7°) or less from the sleeve's axis is chosen for the incline of the taper. Preferably the incline is in the neighborhood of two degrees (2°) so that a low axial resistance is encountered in making the fitting yet the angle is not so small as to require undue length in the sleeve end portions to lock the slides over the latter.

Figure 9:
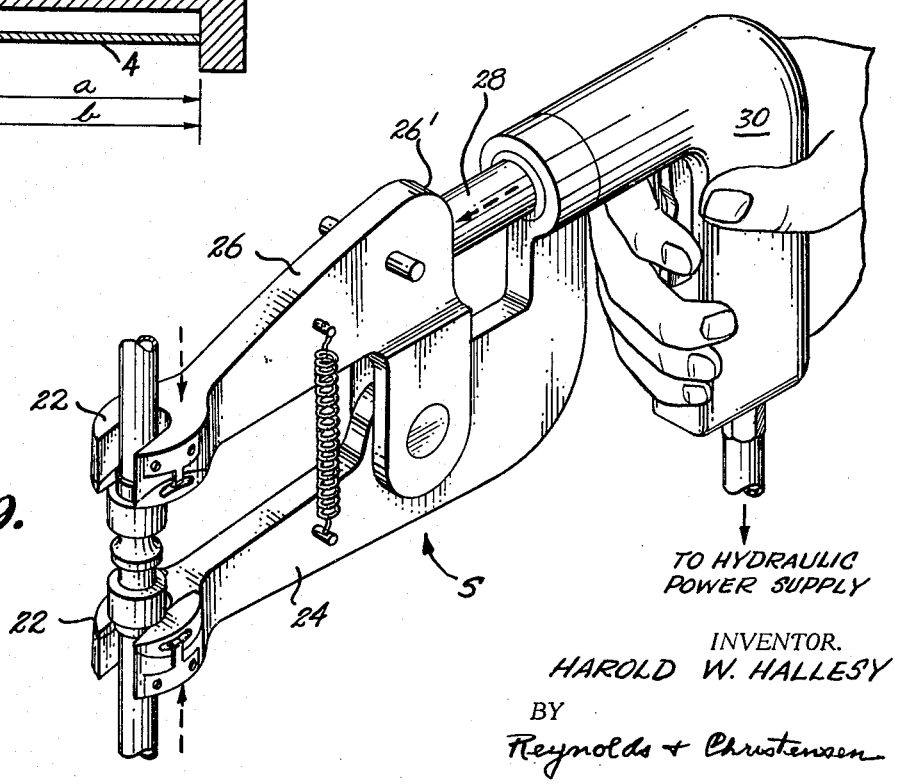
FIGURE 9 is a view in perspective of the step of making the fitting with a squeeze tool referred to more particularly hereafter.

Forced mounting of the slides is accomplished in the manner of FIGURE 9 using a hydraulically operated squeeze device S such as is illustrated therein. It will be seen that the device comprises a pair of jaws 22 which are cooperatively arranged with one another on a pair of L-shaped arms 24 and 26 that are actuated by means of a hydraulic ram 28 disposed in a pistol grip housing 30 on the device. One of the arms, 24, is fixed on the housing with the ram journaled therein, while the other, 26, is pivotally mounted on the first and actuated at its elbow 26' by the ram. Initially the slides are drawn up finger-tight over the sleeve end portions and the jaws of the squeeze device are slipped over the shoulders 6' appearing on the slides. Actuation of the squeeze device then serves to apply equal but opposite forces to the slides in the directions axially of the sleeve. Under these forces the slides are urged up the inclined outside surfaces 20 of the sleeve until they abut the external stops 10 formed about the center of the sleeve. At this point the jaws are relaxed and the squeeze device is withdrawn, the locking taper of the slides being relied on to retain them about the sleeve ends.

Figure 2:
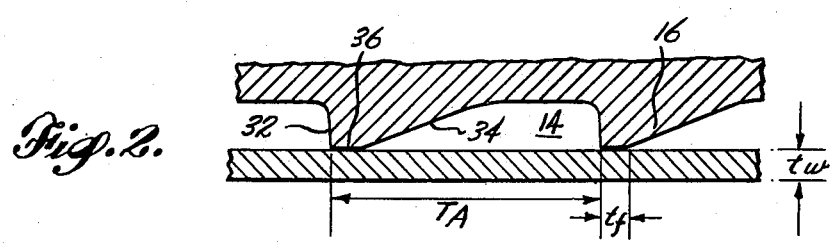
FIGURE 2 is a closer illustration of an uncompleted joint between the sleeve and one tube in the cross section of FIGURE 1.

Reference should now be made to FIGURE 2. It will be seen that each of the serrations has, firstly, a wall 32 that is disposed substantially perpendicular to the radial axis of the sleeve and, secondly, a wall 34 that is sloped acutely with respect to the axis. The tips of the serrations are truncated so that a narrow flat 36 is formed around their inside diameter. The flats make contact with the outside surface 38 of the tube at a particular pitch $T_A$ along the length of the tube. The width of the flats, $T_f$, the tube wall thickness, $T_w$, and the outside diameter of the tube also have a significance in stress calculations I shall disclose hereinafter. Ideally the serrations 16 would take on an arrowhead configuration in which both of their walls rise on rough perpendiculars to the axis of the sleeve and converge to a sharp-edged point. However, such a configuration is not the most practical. It is both difficult to machine to any reasonable degree of uniformity and incapable of providing the strength necessary to stand up under the conditions of installation. Consequently I have adopted a configuration such as that illustrated which is machined in two steps, of which the second step is conducted to develop the flats 36 at a uniform width and diameter. The perpendicular walls 32 are disposed to face axially inwardly of the sleeve for purposes of providing the greatest shearing action at this side of the serrations. The sloping walls 34 lie on the opposite side and are inclined at an angle which lends the greatest strength to the serrations without materially reducing their shearing action. The depth of the serrations is chosen in relation to the material and thickness of the tubes.

Figure 3:
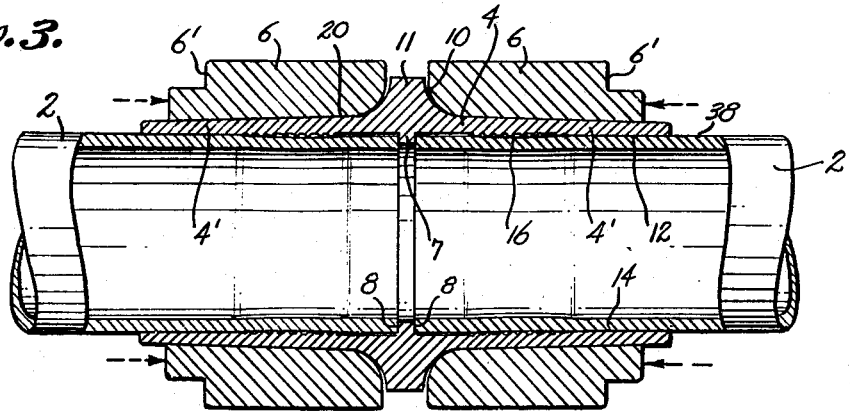
FIGURE 3 is the cross section of FIGURE 1 after the fitting has been completed.
Figure 4:
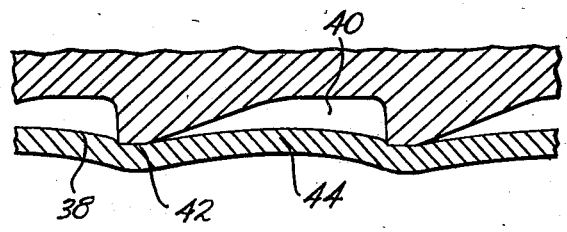
FIGURE 4 is the illustration of FIGURE 2, in this case, however, illustrating the manner in which the sleeve takes a grip on the tube when the joint is completed.

FIGURES 3 and 4 illustrate the result which is achieved when the fitting is made with the squeeze device S. The loading action of the slides on the end portions of the sleeve has the effect of deflecting the sleeve in the radially inward direction in the regions of the serrations. As each undergoes constriction, the serrations are individualy sunk into the outer surface material 38 of the tubes and emboss or indent the surface material to the extent that it is splayed up into the grooves 40 between them. See FIGURE 4. The resultant state of interference between the sleeve and the tubes effectively interlocks the latter with the sleeve. The ends 2' of the tubes remain at their original diameter, however, since the resultant bulge in the wall of each tube begins only at at point slightly inward from its end. Sealing occurs as the local pressure in each indentation 42 along this bulge forms a line seal around the interface of the joint. Each such line seal supplements the others and the total effect is that the single leakage path which existed in the annulus 14 between the members is now closed at repeated points along its length.

The radial forces creating this local pressure may be adjusted to establish either a permanent fitting or a reconnectible fitting. The forces are physically determined by the extent to which the slides are engaged over the sleeve end portions, by the effect they have in the regions of the serrations when so engaged, and by the pitch $T_A$ between serrations. The three factors may be combined to the extent that the local pressure in the indentations causes plastic deformation in the surface material 38 of the tubes. In such a case, a permanent fitting is obtained. On the other hand, a reconnectible fitting may be obtained by reducing the strain in the sleeve and the tubes to a point within their elastic limits so that the grip and seal can be released elastically by providing for differential elastic recovery between the members on removal of the slides. In either case, I fix the first two factors by the spacing given the external stop 10 from each of the series of serrations and the ends of the sleeve. It is then a matter of machining the serrations at a pitch designed to produce the necessary forces.

I have made stress calculations to determine the pitch $T_A$ at which the local pressure becomes high enough to cause plastic deformation in the tubing surface material. It will be remembered that $$S_{ult} = P/A$$

where P = the force applied on the outside of the tube; A = the area over which the force is applied; and $S_{ult}$ = the ultimate compressive stress of the tubing.

Now $$P = P_{(external)} \, (O.D.) \, (t_f)$$

where $P_{(external)} = P_e$ = the pressure applied to the external surface of the tube; and O.D. = the outside diameter of the tube.

And $$A = 2 \, t_w t_a$$

In order for the serrations to apply a local pressure high enough to cause plastic deformation in the tubing $$P_e \geq S_{ult} \text{ or } \frac{P_e}{S_{ult}} \geq 1 \text{ or } \frac{2 t_w t_a}{O.D. \, t_f} \geq 1$$

$$\text{or } \frac{t_a}{t_f} \geq \frac{O.D.}{2 t_w} \text{ or } t_a = \frac{O.D. \, (t_f)}{2(t_w)}$$

Thus, assuming that a standard width $T_f$ is chosen for the serration flats 36, such as .001", the pitch $T_a$ should be increased inversely in proportion to the tube wall thickness $T_w$ and directly in proportion to the tube outside diameter O.D., where a permanent fitting is desired. Plastic deformation occurs in the indentations made by the serrations, while elastic deformation occurs in the splayed material 44 between such.

The fitting has numerous virtues. First of all notice its lightness, its simplicity and the ease with which it can be made. (It is approximately one-third the weight of the conventional type illustrated in FIGURE 5.) Although it can be adapted to more complex arrangements, it need comprise no more than the three basic elements illustrated, that is, the sleeve and the two slides. Note, too, the simple structural nature of each element and the fact that there is neither a necessity for special strain links, nor a necessity for preparation of the tube ends before assembly. The sealing and locking features of the fitting are obtained entirely through the radial coaction of the elements. The material at the point of seal, that is, each serration and the surface of the tube, has the same life as the rest of the fitting and, consequently, there are no aging or life limitations imposed on the fitting by the choice of materials in the joint, as would be the case with the use of less durable materials, such as elastomeric materials, to make the seal. The tubes need not be flared, grooved or otherwise permanently deformed to provide a locking collar or edge to accomplish a grip. Moreover, there is no necessity for applying heat to the tubes at the time of installation. Consequently, there is no risk of annealing the tube material. This feature is particularly significant in a comparison with brazed, welded, or other types of permanent fittings which are heat formed.

Note further the facility with which my fitting can be installed. As soon as the tube ends are inserted in the sleeve and the slides drawn up to the latter, there remains only the step of forcing the slides over the sleeve with the squeeze device. The latter can be held in one hand and operated quite readily under cramped conditions and at a point limited only by the reach of the operator. The external stops serve to assure that the slides are engaged up to but no further than the extent necessary to saddle the sleeve about the ends of the tubes. There is no difficulty of applying or observing the application of brazing or welding material at the fitting site. Neither is there the difficulty of obtaining the proper installation torque as in the case of threaded and bolted fittings.

Brazed and welded fittings are also attended by the difficulty of inspecting the integrity of the joint and seal. A simple inspection procedure with my fitting is to apply an inspection mark to each of the tubes that is partially covered by the fitting before the slides are engaged. Visual inspection of the position of the mark after they are engaged indicates from the shift in material whether or not the sleeve has taken the proper grip on the tubes.

Of course, the fitting can be adapted to conform with all of the present fluid fitting forms, such as tees, elbows and crosses. The fitting can also be adapted for use in larger components such as pumps and actuators.

The usefulness of any fitting is measured in principal by its reliability. The reliability of a fitting is tested by its ability to support the tube ends without fatiguing and its ability to withstand increased pressures, thermocycling, and vibration. Note the intimacy of contact among the elements which go into my fitting. The tubes themselves are drawn up virtually end-to-end to one another. The sleeve is strapped tightly around the adjoining ends and intimately constricted about much of the joint in the manner of a girdle. The slides, of course, are brought into the most intimate contact possible with the sleeve and are individually engaged so as to have no axial interrelationship affecting the integrity of the fitting. In essence, the tube end portions, the sleeve and the slides are united so closely as to have the character of a single monolithic mass of metal. This is significant under all of the tests mentioned above. The fitting elements, in effect, act as a single member formed as a collar about the tubes and lend the maximum support to the joint. Any bending forces on the tubes are resisted by the full length of the sleeve. Due to the fact that the holding or gripping forces are exercised entirely in radial planes of the fitting, it is apparent also that any increase in pressure within the fitting will have the effect of actually increasing its sealing integrity. Moreover, no axial forces can be imposed on the slides tending to loosen them in service. Therefore, pressure surges and the like cannot induce backoff of the slides. Vibration-induced forces will also have no effect on the locking fit of the slides, nor on the integrity of the grip and the seal.

Above all, thermally-induced stresses are distributed uniformly over the entire cross-section of the fitting at the point of generation. The fitting flexes as a whole and no one part is stressed any differently than another assuming a like coefficient of expansion among the members, which is the case with my stainless steel members in the illustrated embodiment.

Figure 5:
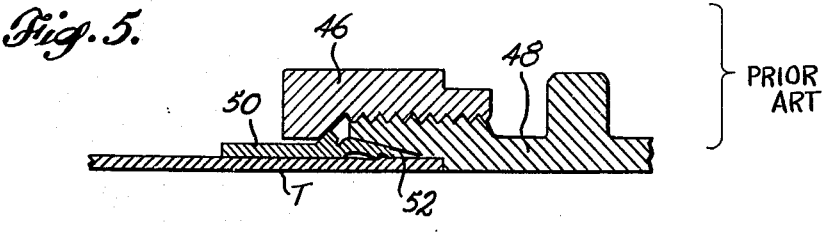
FIGURE 5 is an axial cross section through a typical prior art fitting.
Figure 6:
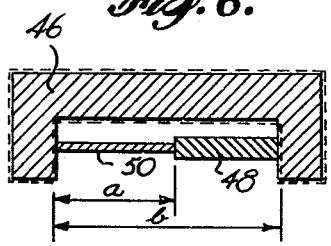
FIGURES 6 and 7 are schematic illustrations of the strain pattern arising in the prior art fitting under thermally-induced forces.
Figure 7:
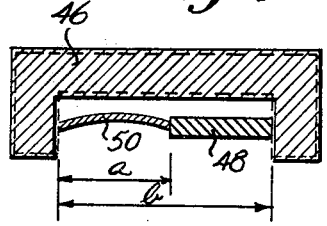
Figure 8:
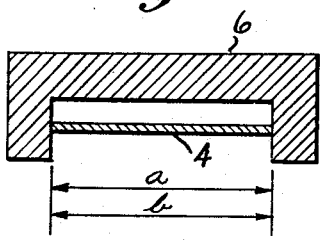
FIGURE 8 is a schematic illustration of the strain pattern of my own fitting under thermally-induced forces.

To explain this, I have included several schematic representations of the strain pattern which occurs in each of the typical prior art fitting of FIGURE 5 and my own. Note that the prior art fitting uses a nut 46 which is threaded onto a body 48, to constrict a sleeve 50 diametrically into sealing and gripping engagement with a tube T when the sleeve is forced axially up against a tapered end wall 52 of the body 48 by advancing the nut on the threads of the body. In FIGURES 6–8, $a$ represents the major elastic reacting strain and $b$ the thermally-induced strain. FIGURE 6 illustrates the strain relation existing when the major elastic reacting strain is in tension, that is, when the temperature in nut 46 is greater than that in body 48 and sleeve 50. A high elastic recovery is required in sleeve 50, together with high initial stress, if the seal is not to be lost by relaxation of the sleeve on thermal cycling. On the other hand, when the temperature in nut 46 is less than that in body 48 and sleeve 50, a high unit strain and compressive stress are induced in sleeve 50, as illustrated in FIGURE 7. Referring to FIGURE 8, however, it will be seen that by comparison sleeve 4 in my fitting experiences the lowest unit strain and stress possible, while undergoing the highest sealing forces obtainable without the use of special strain links or cartridges, when a thermal differential exists across the fitting.

Of course, other means, such as a ring and locator groove can be used to form the internal stops.

What is claimed is:

1. A tube fitting comprising a sleeve, a pair of tubes, and a pair of annular slides, all of which are made of the same hard, tough metallic material, and wherein the end portions of the tubes are inserted into the end portions of the sleeve and positioned within axially spaced regions thereof whose inside walls have series of circumferential serrations thereon whose inside diameter corresponds to the outside diameter of the tube end portions in a relaxed state, the tube ends themselves being disposed in the space between the aforesaid regions, and the inside surfaces of the slides being complementally tapered at an angle of approximately 2° with the outside surfaces of the sleeve end portions, but diametrically undersized with respect to the aforesaid outside surfaces of the sleeve end portions, and the slides being separately and independently engaged in a surface-to-surface condition over the sleeve end portions so that the aforesaid regions thereof are deflected radially inwardly to the extent that the serrations are individually indented into the tube end portions, and the tube material is plastically deformed by the indentations, to interlock the tubes and sleeve in a state of interference with one another at each serration, and to maintain the state of interlock solely by the engagement of the slides on the sleeve end portions.

2. A tube fitting according to claim 1 wherein there are centrally located external stops positioned on the outside of the sleeve between the regions of the serrations, and the slides are in endwise abutment therewith.

3. A tube fitting according to claim 1 wherein there are centrally located internal stops positioned inside of the sleeve between the regions of the serrations, and the tubes are in endwise abutment therewith.

References Cited

UNITED STATES PATENTS

| | | | |
|---|---|---|---|
| 351,263 | 10/1886 | Hemphill | 285—383 |
| 418,752 | 1/1890 | Rogers | 285—383 X |
| 1,186,813 | 6/1916 | McFerran. | |
| 2,011,433 | 8/1935 | Blagg et al. | |
| 2,233,214 | 2/1941 | Lamont | 285—383 X |
| 2,383,692 | 8/1945 | Smith | 285—369 X |
| 2,507,261 | 5/1950 | Mercier. | |
| 2,535,694 | 12/1950 | Payne. | |
| 2,613,959 | 10/1952 | Richardson. | |
| 3,149,860 | 9/1964 | Hallesy. | |

FOREIGN PATENTS

| | | |
|---|---|---|
| 791,491 | 9/1935 | France. |
| 704,045 | 3/1941 | Germany. |
| 15,358 | 11/1884 | Great Britain. |

REINALDO P. MACHADO, Primary Examiner

D. W. AROLA, Assistant Examiner

U.S. Cl. X.R.

285—382.2, 383, 417